(12) United States Patent
Chai et al.

(10) Patent No.: US 10,120,672 B2
(45) Date of Patent: Nov. 6, 2018

(54) METHOD FOR OFFLINE UPDATING VIRTUAL MACHINE IMAGES

(71) Applicant: CHINA UNIONPAY CO., LTD., Shanghai (CN)

(72) Inventors: Hongfeng Chai, Shanghai (CN); Chengrong Wu, Shanghai (CN); Zhijun Lu, Shanghai (CN); Jie Wu, Shanghai (CN); Mingbo Wang, Shanghai (CN); Zhihui Lv, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 201 days.

(21) Appl. No.: 15/036,862

(22) PCT Filed: Nov. 21, 2014

(86) PCT No.: PCT/CN2014/091873
§ 371 (c)(1),
(2) Date: May 16, 2016

(87) PCT Pub. No.: WO2015/078333
PCT Pub. Date: Jun. 4, 2015

(65) Prior Publication Data
US 2016/0378456 A1 Dec. 29, 2016

(30) Foreign Application Priority Data
Nov. 26, 2013 (CN) .......................... 2013 1 0604253

(51) Int. Cl.
G06F 9/44 (2018.01)
G06F 8/65 (2018.01)
(Continued)

(52) U.S. Cl.
CPC ............ *G06F 8/65* (2013.01); *G06F 9/45558* (2013.01); *H04L 67/34* (2013.01);
(Continued)

(58) Field of Classification Search
CPC ....... G06F 8/315; G06F 9/45558; H04L 67/34
See application file for complete search history.

(56) References Cited

U.S. PATENT DOCUMENTS 9,641,406 B1 * 5/2017 Allen ........................ G06F 8/65
2009/0007105 A1 1/2009 Fries et al.
(Continued)

FOREIGN PATENT DOCUMENTS

CN 102402446 A 4/2012

OTHER PUBLICATIONS

Wu Zhou et al., Always Up-to-date—Scalable Offline Patching of VM Images in a Compute Cloud, ACM, 2010, retrieved online on Jul. 9, 2018, pp. 1-10. Retrieved from the Internet: <URL: http://discovery.csc.ncsu.edu/pubs/acsac10b.pdf>. (Year: 2010).*

*Primary Examiner* — Hanh Thi-Minh Bui
(74) *Attorney, Agent, or Firm* — The Ollila Law Group LLC

(57) ABSTRACT

The present invention proposes a method for offline upgrading virtual machine mirror images. The method comprises: an mirror image security server collecting virtual machine mirror images, and extracting and storing the information of the collected virtual machine mirror images; and the mirror image security server executing an upgrade operation of virtual machine mirror images in an offline way based on the information of the collected virtual machine mirror images. The method for offline upgrading virtual machine mirror images disclosed in the present invention has higher upgrade efficiency and is capable of upgrading the virtual machine mirror images in an offline way.

4 Claims, 1 Drawing Sheet

(51) Int. Cl.
*G06F 9/455* (2018.01)
*H04L 29/08* (2006.01)

(52) U.S. Cl.
CPC .............. *G06F 2009/45562* (2013.01); *G06F 2009/45595* (2013.01); *H04L 67/1095* (2013.01)

(56) References Cited

U.S. PATENT DOCUMENTS

| | | | | |
|---|---|---|---|---|
| 2009/0320014 A1* | 12/2009 | Sudhakar | ............ | G06F 9/45533 717/169 |
| 2011/0265076 A1* | 10/2011 | Thorat | ................ | G06F 8/65 717/172 |
| 2014/0208314 A1* | 7/2014 | Jeswani | ............. | G06F 9/45533 718/1 |

* cited by examiner

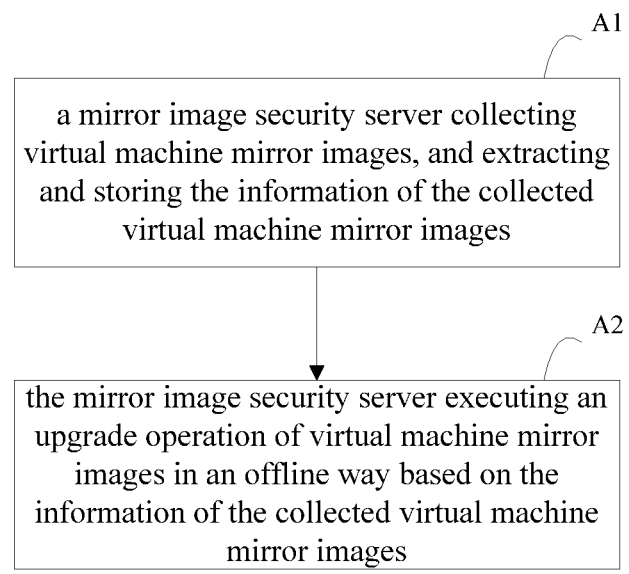

METHOD FOR OFFLINE UPDATING VIRTUAL MACHINE IMAGES

TECHNICAL FIELD

The present invention relates to an method for offline upgradeing, more specifically to an method for offline upgrading virtual machine mirror images ("offline upgrade" as used herein means that the virtual machine mirror images are upgraded without actuating the virtual machines).

BACKGROUND

Currently, with the application of computer and network is increasingly widespread and business types of the different fields are increasingly enriched, cloud computing environments become more and more widespread and important. Usually, there exist a mass of offline virtual machine mirror images (or virtual machine templates) in the cloud computing environment, and thus upgrading (i.e. patching) the offline virtual machine mirror images (or virtual machine templates) is extremely essential.

In the existing technical solutions, the upgrade for the offline virtual machine mirror images is usually performed in the following two ways: (1) the virtual machines are upgraded online after they are generated by users; and (2) an upgrade script is injected into the virtual machine mirror images, subsequently when a virtual machines are generated based on the virtual machine mirror images, the generated virtual machines would automatically execute the upgrade script for online upgrading.

However, the existing technical solutions have the following problems: whether the upgrade operation having be executed cannot be assured, and the upgrade will take a long time, thereby causing the upgrade is less efficient.

Therefore, there exists the following requirement: to provide a method for offline upgrading the virtual machine mirror image which has higher upgrade efficiency.

SUMMARY

In order to solve the above problems existed in the existing technical solutions, the present invention provides a method for offline upgrading the virtual machine mirror image which has higher upgrade efficiency.

The purpose of the present invention is realized through the following technical solution:

A method for offline upgrading virtual machine mirror images comprising the following steps:
(A1) a mirror image security server collecting the virtual machine mirror images, and extracting and storing the information of the collected virtual machine mirror images; and
(A2) the mirror image security server executing the upgrade operation of virtual machine mirror images in an offline way based on the information of the collected virtual machine mirror images.

In the solution disclosed above, preferably, the step (A1) further comprises:
(B1) downloading the virtual machine mirror images periodically from a virtual machine mirror image storage server; and
(B2) excuting the following steps for each of the downloaded virtual machine mirror images: (1) detecting the virtual machine mirror images to acquire the basic information of the virtual machine mirror images and storing the basic information into a metadata database; (2) processing the virtual machine mirror images in a way of software package management associated with the virtual machine mirror images based on the basic information; and (3) extracting software package information of the virtual machine mirror images and storing the software package information into a software package information database.

In the solution disclosed above, preferably, the step (A2) comprises: excuting the following steps for each of the downloaded virtual machine mirror images after the step (B2): (1) reading out the associated software package information from the software package information database; (2) comparing the software package information which be read out with the information in an upgrade information database to find out the software files to be upgraded, wherein a published patch files being stored in the upgrade information database; (3) if the patched software files corresponding to the softwares to be upgraded do not exist in an offline patch database, executing a script analysis and rewriting operation and storing the involved patched software files into the offline patch database, otherwise if not so, finding out the patched software files corresponding to the software files to be upgraded in the offline patch database, and then replacing the corresponding software files in the virtual machine mirror images with the patched software files corresponding to the software files to be upgraded; (4) updating the software package information database to ensure the information about the virtual machine mirror images in the software package information database is consistent with the current actual information of the virtual machine mirror images; and (5) transmitting the virtual machine mirror images which have been processed by the upgrade operation back to the virtual machine mirror image storage server.

In the solution disclosed above, preferably, the script analysis and rewriting operation comprises the following steps: (1) analyzing the patch scripts in the related patch files to check whether the patch scripts can be executed safely under the offline environment, and if the patch scripts can be executed safely under the offline environment then proceeding to the step (3), otherwise proceeding to the step (2); (2) determining whether the patch scripts can be converted into the scripts which can be executed safely under the offline environment, and if the patch scripts can be converted into the scripts which can be executed safely under the offline environment, then converting the patch scripts into the patch scripts which can be executed safely under the offline environment through a script rewriting way and subsequently proceeding to step (3), otherwise, setting the patch scripts to be executing automatically upon the virtual machine mirror images are actuated next time; and (3) executing the patch scripts.

In the solution disclosed above, preferably, each script command in the patch scripts is one of the following types: it can be executed correctly under the offline environment, it cannot be executed correctly under the offline environment, and it would be unnecessarily executed under the offline environment.

In the solution disclosed above, preferably, the script rewriting comprises executing the following steps based on the type of each script command in the patch scripts: (1) removing or replacing unwanted commands; and (2) removing unwanted statement control structures.

The method for offline upgrading virtual machine mirror images disclosed in the present invention has the following advantages: (1) the software files to be upgraded in the virtual machine mirror images can be retrieved quickly; (2) the virtual machine mirror images can be upgraded (i.e.

patched) in the offline way; and (3) the efficiency of the upgrade operation of virtual machine mirror images can be obviously enhanced.

BRIEF DESCRIPTION OF THE DRAWINGS

The technical features and advantages of the present invention will be better understood by the ones skilled in the art in combination with the appended drawings, in which:

FIG. 1 is a flowchart of the method for offline upgrading virtual machine mirror images according to the embodiment of the present invention.

DETAILED DESCRIPTION

FIG. 1 is a flowchart of the method for the offline upgrading virtual machine mirror images according to an embodiment of the present invention. As illustrated in FIG. 1, the method for offline upgrading virtual machine mirror images disclosed in the present invention comprises the following steps: (A1) an mirror image security server collecting virtual machine mirror images, and extracting and storing the information of the collected virtual machine mirror images; and (A2) the mirror image security server executing an upgrade operation of virtual machine mirror images in an offline way based on the information of the collected virtual machine mirror images.

Preferably, in the method for offline upgrading virtual machine mirror images disclosed in the present invention, the step (A1) further comprises: (B1) downloading virtual machine mirror images periodically from a virtual machine mirror image storage server (e.g. the Glance component server on the OpenStack platform); and (B2) excuting the following steps for each of the downloaded virtual machine mirror images: (1) detecting the virtual machine mirror images to acquire the basic information (e.g. the type of the operating system, the version of the operating system, the employed software package management way, and so on) of the virtual machine mirror images and storing the basic information into a metadata database; (2) processing the virtual machine mirror images in a way of software package management associated with the virtual machine mirror images (such as the yum and dpkg package management ways) based on the basic information; and (3) extracting the software package information (e.g. the information about software version) of the virtual machine mirror images and storing the package information into a software package information database.

Exemplarily, in the method for offline upgrading virtual machine mirror images disclosed in the present invention, the virtual machine mirror images are open source virtualization format (OVF) files.

Preferably, in the method for offline upgrading virtual machine mirror images disclosed in the present invention, the step (A2) comprises: excuting the following steps for each of the downloaded virtual machine mirror images (i.e., the virtual machine mirror image having the associated software package information stored already in the software package information database) after the step (B2): (1) reading out the associated software package information from the software package information database; (2) comparing the software package information which have been read out with the information in an upgrade information database to find out the software files to be upgraded, wherein a published patch files being stored in the upgrade information database; (3) if the patched software files corresponding to the softwares to be upgraded do not exist in an offline patch database, executing a script analysis and rewriting operation and storing the involved patched software files into the offline patch database, otherwise (i.e., the corresponding patches has already been upgraded by other similar virtual machine mirror images), finding out the patched software files corresponding to the software files to be upgraded in the offline patch database, and then replacing the corresponding software files in the virtual machine mirror images with the patched software files corresponding to the software files to be upgraded; (4) updating the software package information database to ensure the information about the virtual machine mirror images in the software package information database is consistent with the current actual information of the virtual machine mirror images (i.e., the virtual machine mirror images are already at the latest state); and (5) transmitting the virtual machine mirror images which have been processed by the upgrade operation back to the virtual machine mirror image storage server.

Preferably, in the method for offline upgrading virtual machine mirror images disclosed in the present invention, the script analysis and rewriting operation comprises the following steps: (1) analyzing the patch scripts in the related patch files to check whether the patch scripts can be executed safely under the offline environment, and if the patch scripts can be executed safely under the offline environment then proceeding to the step (3), otherwise proceeding to the step (2); (2) determining whether the patch scripts can be converted into the scripts which can be executed safely under the offline environment, and if the patch scripts can be converted into the scripts which can be executed safely under the offline environment, then converting the patch scripts into the patch scripts which can be executed safely under the offline environment through a script rewriting way and subsequently proceeding to step (3), otherwise, setting the patch scripts to be executing automatically upon the virtual machine mirror images are actuated next time (for example through placing them into the file directory which will run automatically upon the operating system is running); and (3) executing the patch scripts.

Exemplarily, in the method for offline upgrading virtual machine mirror images disclosed in the present invention, each script command in the patch scripts is one of the following types: it can be executed correctly under the offline environment, it cannot be executed correctly under the offline environment, and it would be unnecessarily executed under the offline environment.

Preferably, in the method for offline upgrading virtual machine mirror images disclosed in the present invention, the script rewriting comprises executing the following steps based on the type of each script command in the patch scripts: (1) removing or replacing unwanted commands; and (2) removing unwanted statement control structures.

It can be seen from the above, the method for offline upgrading virtual machine mirror images disclosed in the present invention has the following advantages: (1) the software files to be upgraded in the virtual machine mirror images can be retrieved quickly; (2) the virtual machine mirror images can be upgraded (i.e. patched) in the offline way; and (3) the efficiency of the upgrade operation of virtual machine mirror images can be obviously enhanced.

Although the present invention is described by means of the above preferred embodiments, but its implementation is not limited to the above embodiments. It should be recognized that those skilled in the art could make various changes and modifications to the present invention without departing from the spirit and scope of the present invention.

The invention claimed is:

1. A method for offline upgrading virtual machine mirror images comprising the following steps:
- (A1) a mirror image security server collecting virtual machine mirror images, and extracting and storing an information of the collected virtual machine mirror images; and
- (A2) the mirror image security server executing an upgrade operation of virtual machine mirror images in an offline way based on the information of the collected virtual machine mirror images, wherein:

the step (A1) further comprises:
- (B1) downloading the virtual machine mirror images periodically from a virtual machine mirror image storage server; and
- (B2) executing a following steps for each of the downloaded virtual machine mirror images: (1) detecting the virtual machine mirror images to acquire a basic information of the virtual machine mirror images and storing the basic information into a metadata database; (2) processing the virtual machine mirror images in a way of software package management associated with the virtual machine mirror images based on the basic information; and (3) extracting a software package information of the virtual machine mirror images and storing the software package information into a software package information database; and the step (A2) comprises:
executing a following steps for each of the downloaded virtual machine mirror images after the step (B2): (1) reading out the associated software package information from the software package information database; (2) comparing the software package information which have been read out with an information in an upgrade information database to find out software files to be upgraded, wherein a published patch file being stored in the upgrade information database; (3) if the published patched software file corresponding to the software file to be upgraded do not exist in an offline patch database, executing a script analysis and rewriting operation and storing the involved patched software files into the offline patch database, otherwise, finding out the patched software files corresponding to the software files to be upgraded in the offline patch database, and then replacing the corresponding software files in the virtual machine mirror images with the patched software files corresponding to the software files to be upgraded; (4) updating the software package information database to ensure the information about the virtual machine mirror images in the software package information database is consistent with a current actual information of the virtual machine mirror images; and (5) transmitting the virtual machine mirror images which have been processed by the upgrade operation back to the virtual machine mirror image storage server.

2. The method for offline upgrading virtual machine mirror images of claim 1, characterized as, the script analysis and rewriting operation comprises the following steps: (1) analyzing patch scripts in related patch files to check whether the patch scripts can be executed safely under an offline environment, and if the patch scripts can be executed safely under the offline environment then proceeding to the step (3), otherwise proceeding to the step (2); (2) determining whether the patch scripts can be converted into scripts which can be executed safely under the offline environment, and if the patch scripts can be converted into the scripts which can be executed safely under the offline environment, then converting the patch scripts into the patch scripts which can be executed safely under the offline environment through a script rewriting way and subsequently proceeding to step (3), otherwise, setting the patch scripts to be executing automatically upon the virtual machine mirror images are actuated next time; and (4) executing the patch scripts.

3. The method for offline upgrading virtual machine minor images of claim 2, characterized as, each script command in the patch scripts is one of the following types: it can be executed correctly under the offline environment, it cannot be executed correctly under the offline environment, and it would be unnecessarily executed under the offline environment.

4. The method for offline upgrading virtual machine minor images of claim 3, characterized as, the script rewriting comprises executing the following steps based on the type of each script command in the patch scripts: (1) removing or replacing unwanted commands; and (2) removing unwanted statement control structures.

* * * * *